(No Model.) 2 Sheets—Sheet 2.
D. OWEN.
APPARATUS FOR THE PURIFICATION OF MOLTEN TIN OR ITS ALLOYS.
No. 504,238. Patented Aug. 29, 1893.
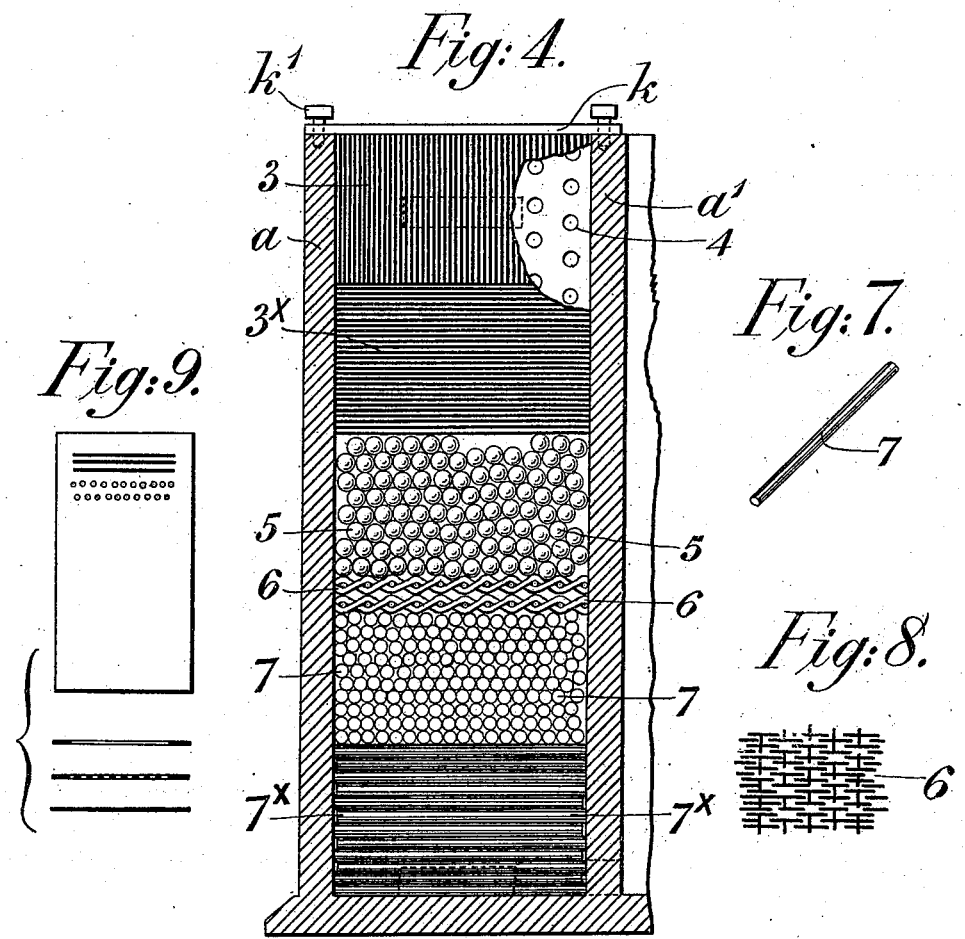
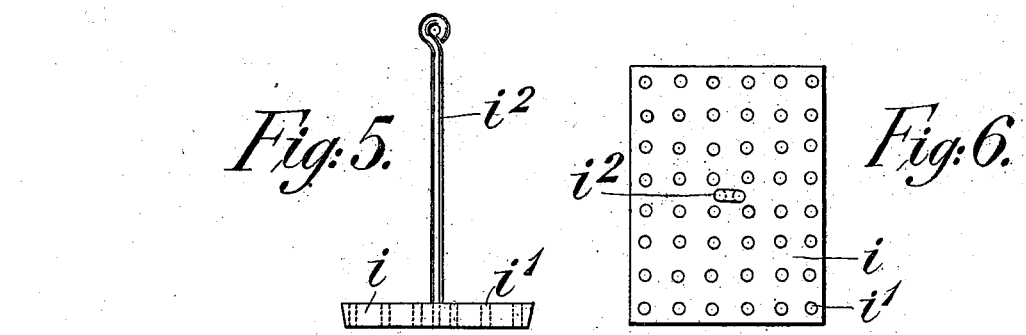
Witnesses
C. D. Kesler
Wm N Bates
Inventor
David Owen
By John J. Halsted & Son
his Attorneys

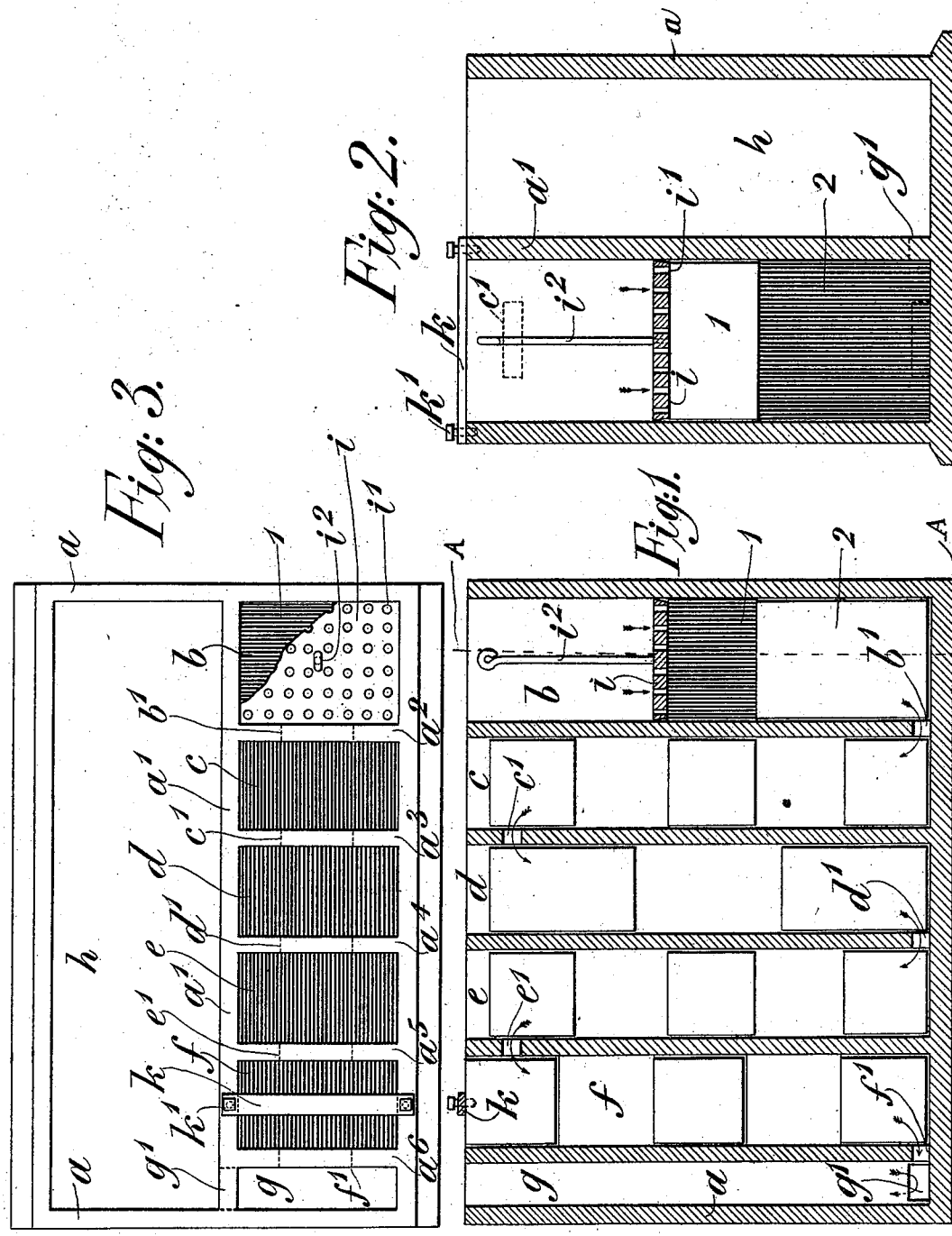

United States Patent Office.

DAVID OWEN, OF MORRISTON, NEAR SWANSEA, ENGLAND.

APPARATUS FOR THE PURIFICATION OF MOLTEN TIN OR ITS ALLOYS.

SPECIFICATION forming part of Letters Patent No. 504,238, dated August 29, 1893.

Application filed February 9, 1893. Serial No. 461,672. (No model.) Patented in England March 23, 1889, No. 5,037.

*To all whom it may concern:*

Be it known that I, DAVID OWEN, tin-plate manufacturer, a subject of the Queen of Great Britain, residing at Brookfield House, Morriston, near Swansea, in the county of Glamorgan, Wales, England, have invented certain new and useful Improvements in Apparatus for the Purification of Molten Tin or its Alloys, (patented in Great Britain March 23, 1889, No. 5,037;) and I do hereby declare that the following is a full, clear, and exact description of the invention, which will enable others skilled in the art to which it appertains to make and use the same.

This invention relates to means or apparatus for separating scruff or other impurities or more solid matters from molten tin or its alloys, particularly in the manufacture of plates coated therewith.

My invention consists essentially in the systematic collocation and disposing of a series of bodies, one set above another, and in close relation to each other as hereinafter described and through the interstices left between which bodies the molten tin or its alloy is caused to pass, the molten tin or alloy finding its way through the interstices while the "scruff" or impurity of granular or nonfluent nature becomes detained.

In the drawings, Figure 1 shows a longitudinal vertical section of a filtering pot with filtering media. Fig. 2 shows a transverse vertical section taken at right angles to Fig. 1 on the line A of Fig. 1. Fig. 3 shows a plan view of the same. Figs. 4, 7, 8 and 9 show details illustrative of various filtering media and modes of packing the same in the filtering chambers. Figs. 5 and 6 show by side view and plan view a perforated retaining plate $i$.

Referring to Figs. 1, 2 and 3, $a$ is a pot or vessel here shown as having a longitudinal dividing wall $a'$ and other cross walls $a^2$, $a^3$, $a^4$, $a^5$, $a^6$ forming a series of chambers, $b$, $c$, $d$, $e$, $f$, $g$, $h$. In these chambers $b$—$f$ inclusive I pack filtering media of one or more of the descriptions hereinafter referred to. In Fig. 1 I have shown the upper part of the chamber $b$ packed with thin metal plates arranged at 1 vertically, side by side, and transversely of the greater length of the pot, at 2 other plates are arranged vertically, longitudinally of the pot as regards their smallest diameter.

$i$ is a plate having perforations $i'$ through which the molten metal introduced to the upper part of the chamber $b$ percolates, and thence through the filtering plates at 1 and 2.

$i^2$ is a handle for removing the plate $i$.

The chambers $c$, $d$, $e$ and $f$ are shown packed with plates which may be in varied directions substantially in the same manner as the chamber $b$. $g$ is another chamber which may be packed with filtering media, or not.

$h$ is a dipping chamber.

$k$ is a cross bar for keeping down the plates in the chamber $f$, which bar is secured to the side walls thereof by the screw studs $k'$. These cross bars or their equivalent may be multiplied or not as found convenient.

Fig. 4 shows to a larger scale in section transversely of the pot Fig. 1 a chamber with such a cross bar $k$ and screw studs $k'$ in position. In this illustration plates 3 forming the filtering media are packed vertically alternately with other plates $3^\times$ packed horizontally in the same plane as the greater length of the pot, but in the case of plates laid horizontally it is convenient to form the dividing walls between the cells with perforations 4 to facilitate flow of metal. The portion next below $3^\times$ shows the filtering media composed of shot 5, which may be divided by woven plates 6 from the next layer of filtering media.

7 and $7^\times$ show the filtering media composed of rods of metal in two groups crossed at right angles to each other. Fig. 7 shows separately one of these rods of metal.

Fig. 8 shows a small piece of one of the woven plates 6 separately in plan.

Fig. 9 shows the face of one of the plates 3 or $3^\times$. The sections below this figure are taken respectively the upper one through the slits the middle one through the holes and the bottom one through the solid part of the plate. The holes may be of one grade throughout or the plate may be solid throughout.

The filtering media may be made up of modifications or combinations of the arrangements of any of the preceding forms of media. The tin from the chamber $b$ passes by the opening $b'$ in the direction of the arrows up $c$ to the opening $c'$, thence into $d$, and by the opening $d'$ into $e$, by the opening $e'$ into $f$, by the opening $f'$ into $g$, by the opening $g'$ into $h$, which will then contain the clarified tin.

The number of chambers as $b, c, d, e, f, g$ may be multiplied or varied according to the requirements of the case. The molten tin is poured in at $b$, passes through the filter at $b'$ into the chamber $c$, thence by the filter $c'$ into the chamber $d$, thence by the chamber $d'$ into the chamber $h$, which may be the tinning pot.

I employ a vessel containing the molten tin or its alloys which is divided, the molten tin or its alloys being placed in one division as $b$, and being caused to pass through a reticulate surface or filtering mass composed of the aggregations of pieces of metal constituting the whole or a part or parts of the separating media or division wall or walls whereby only the molten metal is permitted to pass and scruff or other impurity is detained by the reticulate intervening mass or wall and the cleansed metal can be drawn off, or removed from the secondary division or divisions, or further purified if requisite by being permitted to pass to another chamber or vessel through a passage protected by reticulate work, and so on to other chambers if required. These secondary or subsequent chambers being in construction merely substantial repetitions of those shown need not be and are not shown.

A convenient form of apparatus shown by Figs. 1, 2, 3 consist of a chamber or chambers which may be approximately oblong or square and of considerable area, containing a quantity of metal introduced at $b$ which is in usual manner kept molten by a furnace or other heat, not shown, beneath, and from this chamber is a communication through separating media with a tinning pot as $h$ in which the tinning or like operation may be carried on, the molten metal from the chamber at $b$ having to pass to the tinning pot $h$ through a wall or division or walls or divisions and masses of filtering media consisting of reticulate work or masses of plates, wires, shot, woven wirework or equivalent intercepting aggregated bodies.

The reticulate work may consist of woven wire of fine mesh, wire gauze, or fiber or other suitable straining material or of assembled plates, sheets, wires of any suitable section, bricks, cubes, balls, or like bodies of metal, asbestos or refractory materials capable of giving sufficiently fine filtering passages, the degree of filtration being regulated by multiplication of the number of sheets, plates or thicknesses of woven wire net or metal surfaces as well as by variation in the size of mesh.

The molten metal in the tinning pot may from time to time as it becomes impregnated with any impurities be returned to the first division of the vessel and be made again to pass the filtering screen.

I am aware that it has been proposed to filter molten tin through a mass of scruff from a previous melting contained in a vessel protected above by bars and then passing through interstices formed by an assemblage of vertical wires packed in orifices from said vessel but I make no claim to such arrangement.

Having now particularly described and ascertained the nature of my said invention and in what manner the same is to be performed, I declare that what I claim is—

1. In apparatus for purifying tin and its alloys, a vessel having a series of filtering chambers separated by vertical partitions, and having communicating openings alternately at the bottom and top of such partitions, each of such chambers being provided with a filtering mass composed of a series of filtering materials of different kinds superposed one above the other, substantially as set forth.

2. In apparatus for purifying tin and its alloys, a series of filtering chambers having each a passage communicating directly with the next chamber and each provided with a filtering mass composed of a series of filtering materials of different kinds located one above the other and disposed vertically, horizontally and transversely of each other substantially as set forth.

3. In combination with the series of communicating filtering chambers, each provided with a series of filtering materials placed one upon the other as described, a tinning pot in communication with the bottom of the last one of such chambers, all substantially as set forth.

4. A filter for molten tin and its alloys composed of metal rods placed vertically and horizontally, metal shot or balls, and reticulate work, disposed as set forth in a series of adjoining chambers communicating with each other, and through each and all of which the molten liquid is caused to pass.

In testimony whereof I, the said DAVID OWEN, have hereunto set my hand this 18th day of January, 1893.

DAVID OWEN.

Witnesses:
JNO. W. PACKE,
D. MCLELLAND.